May 10, 1949.  H. P. WATSON ET AL  2,470,059
SAFETY DEVICE

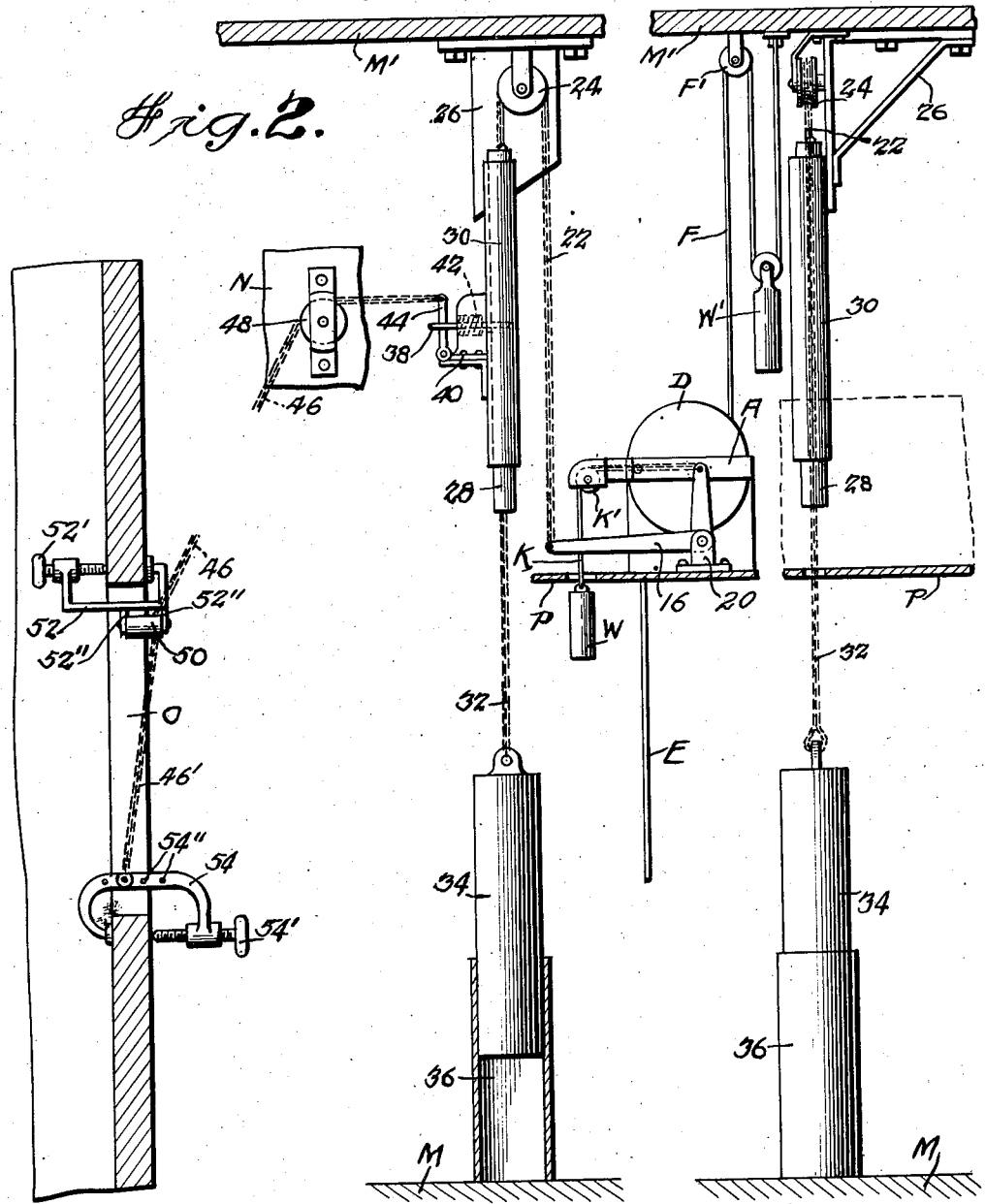

Filed March 20, 1945  2 Sheets-Sheet 2

INVENTORS
H. P. Watson &
George W. Rogers.

Patented May 10, 1949

2,470,059

UNITED STATES PATENT OFFICE 2,470,059

SAFETY DEVICE

Harvey P. Watson and George W. Rogers, Louisville, Ky.

Application March 20, 1945, Serial No. 583,744

4 Claims. (Cl. 254—173)

This invention appertains to a safety device for automatic power shovels and the like generally, and more particularly to a type of such shovel or scoop mechanisms employed in the unloading of granular, or pulverulent, materials, such as cement, fertilizer, grain, sand, etc., from railroad box-cars.

One of the several objects of the invention is to provide a novel, efficient, and inexpensive, safety device, in the form of an attachment for certain standard types of automatic power shovel, or scoop, car unloaders, which will operate automatically to disconnect the power from the shovel or scoop actuating mechanism, in the event of an attendant becoming entangled with the shovel or scoop cable.

Another object of the invention has to do with the provision of a safety device of this kind, wherein a flexible element is installed across the door opening of a box-car or the like and is connected with a latch structure that is normally set to lock the clutch control lever, of the power shovel or scoop operating mechanism, so that it will act to release the latch and thereby cause the control lever to be actuated to throw the clutch out of gear, when it is forcibly contacted by a person who may have become entangled with the shovel or scoop cable.

With these and other objects and advantages in view, the invention resides in the certain new and useful combination, construction and arrangement of parts, as will be hereinafter more fully described, set forth in the appended claims, and illustrated in the accompanying drawings, in which:

Figure 1 is a fragmentary, horizontal section, through a central side portion of a box-car, showing a preferred manner of mounting the flexible element of the safety device across the door opening therein;

Figure 2 is a side elevation of the safety device, showing a preferred installation of the same and its operative connection with the clutch control lever of a standard make of automatic power shovel or scoop mechanism, the latter being shown in end elevation;

Figure 3 is a side elevation of the safety device per se, the same being taken at right angles to the side elevation of Figure 2;

Figure 4:
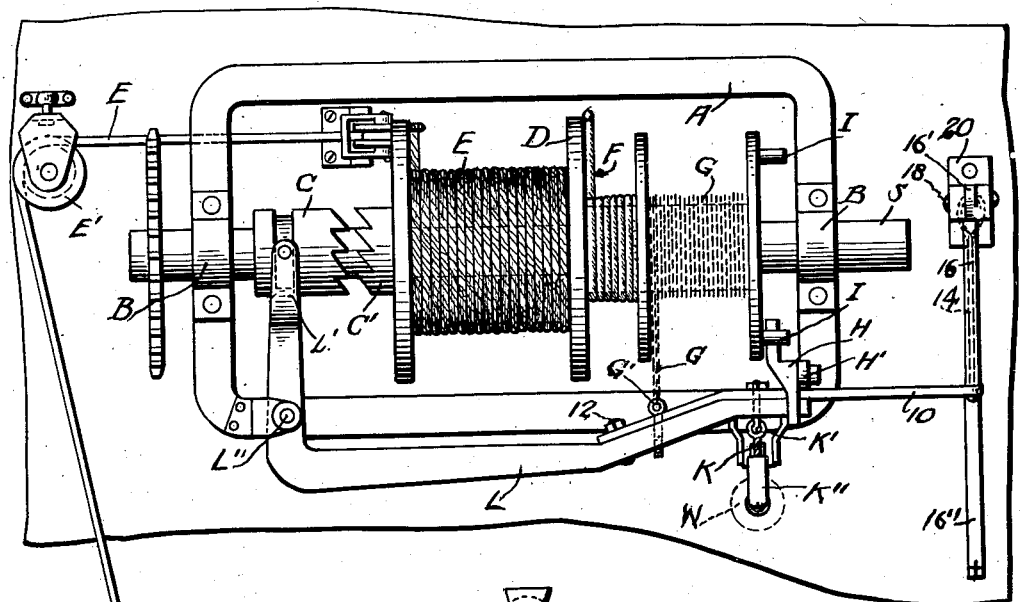
Figure 4 is a top plan view of the power shovel or scoop mechanism and of the operative connections between the clutch control lever thereof and the safety device.
Figure 5:
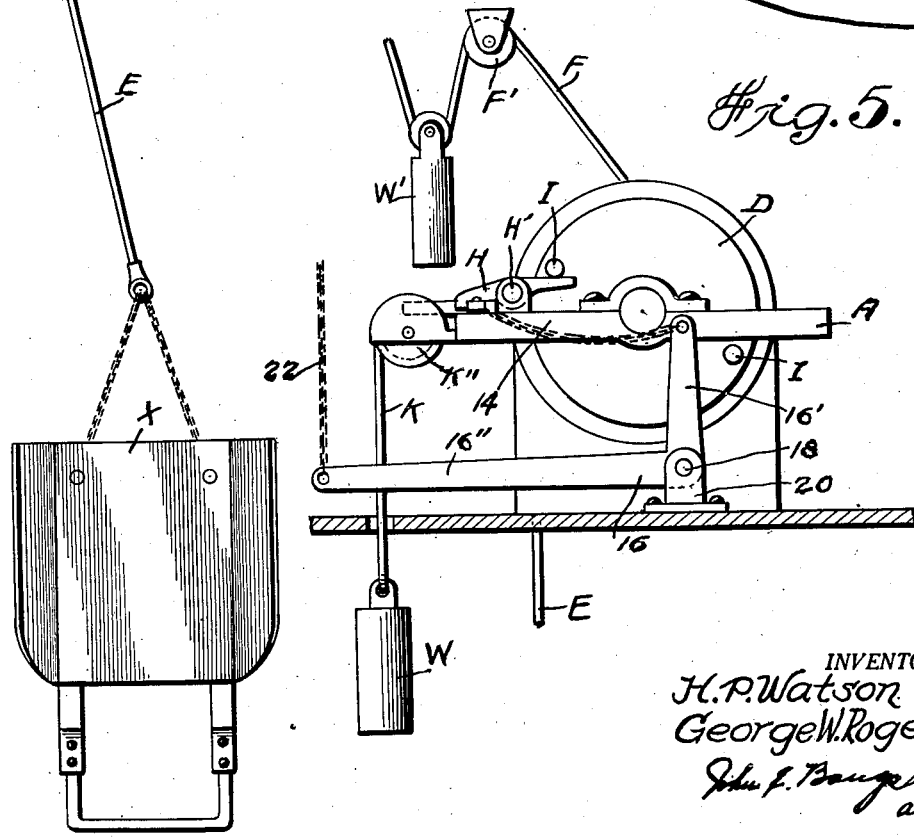
Figure 5 is an end elevation of the power shovel or scoop mechanism, showing the aforesaid operative connections in side elevation.

Referring in detail to the drawings, wherein like characters of reference denote corresponding parts in the several views thereof, the safety device, as it is exemplified therein, is shown in assembly with a standard type of automatic power shovel or scoop mechanism, which is comprised in a base A, having end bearings B for a power driven shaft S, on which a compound drum D is loosely mounted. The drum D is formed to provide three sections, a shovel or scoop cable E being wound on the larger of the end sections; a drum reversing cable F on the intermediate section; and a clutch lever chain G on the remaining end section. The shaft S carries a movable clutch element C, which is cooperative with a fixed clutch element C', carried on the adjacent end of the drum D. The yoked end L', of the shorter arm of a substantially L-shaped lever L, is pivotally engaged with the movable clutch element C, while the lever is pivoted, as at L'', to the base, and has its longer arm extending lengthwise of the latter, at one side thereof. The movable clutch element C is normally held out of engagement with the fixed clutch element C', by means of a latch member H, which is pivoted, as at H', to the base, and has one end adapted to engage the longer arm of the lever L, adjacent its free end; the other end of the latch being disposed in the path of movement of a pair of diametrically opposed pins I, projecting from the outer end of the drum D, i. e., the end of the drum opposite from that on which the fixed clutch element C' is carried. The chain G is connected at its free end, as at G', to the longer arm of the lever L, to one side of the point of engagement of the latch member H therewith, while a flexible element, such as a length of cable K, is likewise connected at one end, as at K', to the longer arm of the lever, between the points of connection of the chain G and engagement of the latch member H with the same. The cable K extends from the lever L, in the direction opposite to that of the chain G and passes downwardly over a sheave K'', bracketed on the outer side of the base A, and carries a counter-weight W, on its depending end. The shovel or scoop cable E passes downwardly from the inner end section of the drum D, and about a sheave E', secured on the floor M, of a framework, which may constitute a portion of a storage warehouse, or like structure, to receive the material to be unloaded from a box-car; the framework including a platform P, for the support of the power shovel or scoop operating mechanism. The drum reversing cable F extends upwardly from the drum D and passes over a swiveled sheave F', fastened to the ceiling M', of the framework, from whence it is looped downwardly and has its free end secured to the ceiling, at one side of the sheave; a counter-weight W' being movably engaged on the looped portion to cause a reversal in direction of rotation of the drum D, when the clutch elements C and C' are disengaged.

In applying the invention to the above described power shovel or scoop mechanism, an elongated bar 10 is secured to the inner side of the longer arm of the clutch control lever L, by means of a bolt 12 and, additionally, by the eye-bolt G', to which the counter-weighted cable K is attached; the free end of the bar projecting beyond the like end of the lever arm for the connection thereto of a short length of chain 14, extending from a point of connection with the free end of the shorter arm 16' of a lever 16, of substantially bell-crank form. The lever 16 is pivoted, as at 18, in a bracket 20, fastened to the platform P. The free end of the longer arm 16'', of the lever 16, is connected by one of the depending ends of a flexible element, such as the chain 22, which is looped about a sheave 24, bracketed, as at 26, to the ceiling M', of the framework, and has its other depending end attached to a rod 28, that is slidable in a guide sleeve 30, depending from a point of connection with the bracket 26. The rod 28 extends through the guide sleeve 30 and has its lower end attached to a flexible element, such as the chain 32, which carries a counter-weight 34 at its lower end; the counter-weight being slidably engaged in a guide tube 36, fastened to the floor M of the framework.

The rod 28 is normally latched in the guide sleeve 30, to hold the counter-weight 34 in its elevated position, thus relieving the lever 16 and the chain 14 of its pull, during the normal operation of the power shovel or scoop mechanism. To this end, the rod 28 is provided with an aperture at a point intermediate its length, that is normally engaged by a latch element or pin 38, projecting inwardly of a registering aperture formed in the guide sleeve 30. The latch pin 38 is slidably mounted in a bracket 40, mounted on the guide sleeve 30, and carries a coiled spring 42 acting to urge it to rod latching position at all times. The outer end of the latch pin 38 is engaged by a lever 44, which is pivoted at one end to the bracket 40 and has its other end connected by one end of a flexible element, such as the chain 46, which passes angularly from its point of connection with the lever and over a sheave 48, mounted on a side wall or element N (Figure 2), of the framework. From the sheave 48, the chain 46 extends to the door opening O, of a box-car or the like, where it is passed beneath a roller 50, carried by a clamp 52, engaged about the near vertical side edge of the door opening and, from thence, is stretched across the door opening for the attachment of its other end to a second clamp 54, engaged about the opposite vertical side edge of the door opening. These clamps 52 and 54 are preferably of the C type, with thumb-screws 52' and 54', respectively, in one of their angled ends, for the securement of the same in place. As shown in Figure 1, the clamp 52 has the outer end of its intermediate portion provided with a pair of spaced ears or lugs 52'', in which the roller 50 is trunnioned; while the clamp 54 has the like portion provided with a series of spaced apertures 54'', for the adjustable securement of the end of the chain therein.

By this arrangement, the portion of the flexible element 46, extending across the door opening O, constitutes a barrier 46' which, when it is forcibly contacted by a person, e. g., the operator of the shovel X, who may become entangled with the shovel cable E, acts to cause quick stoppage of the cable winding mechanism and thus prevent the person from being drawn out from within the car to his possible injury or death.

In the operation of the car unloader and the safety attachment therefor, the shovel or scoop X is secured to the cable E and placed within the box-car, through the door opening O, the cable unwinding from the drum D for the purpose and is passed into the box-car beneath the barrier, formed by the portion of the chain 46 extending across the door opening; the latter portion of the chain being spaced above the floor level of the box-car sufficiently to allow for the required freedom of movement of the cable E. When the clutch elements C and C' are engaged, the drum D is being power driven and the clutch lever L is disengaged from the latch H and held in clutch engaging position by the pull of the counter-weight W on the cable K. In the event of the operator of the shovel or scoop becomes entangled with the cable E, he will be drawn against the barrier portion 46' of the safety chain 46, extending across the door opening O, when his weight against the same will exert a pull on the chain and, through it, on the lever 44, causing the latter to withdraw the latch pin 38 from its engagement with the aperture in the slide rod 28. With the release of the rod 28, the counter-weight 34 immediately drops downwardly of the tube 36, exerting a pull on the cable 32 and the rod 28 and, through them, an upward pull on the cable or chain 22 and the longer arm 16'', of the lever 16. The upward movement of the longer arm 16'' results in a rearward movement of the shorter arm 16' and a like pull on the chain 14 and the bar 10, and through the latter, on the clutch lever D, moving the clutch lever into engagement with the latch member H and disengaging the movable clutch element C from the fixed clutch element C'. With the disengagement of the clutch elements, the drum D is immediately stopped from further winding the cable E and reversed by the action of the counter-weight W' on the cable or chain F, which reversed motion of the drum, causes the cable E to become slack, the portion of the safety chain 46 extending across the door opening O, in the meantime, preventing the operator from being dragged out of the latter.

Without further description, it is thought that the merits of the disclosed embodiment of our invention will be obvious to those engaged in unloading box-cars and the like, or in the manufacture of machinery for such purposes, not only by reason of its effectiveness in avoiding injury to shovel or scoop operatives, but also from the viewpoint of its simplicity and cheapness in construction and ease of installation.

Having thus fully described a preferred embodiment of our invention, it is to be understood that changes in design and minor details of construction and arrangement of parts may be resorted to, within the limits defined by the scope of the appended claims.

What we claim is:

1. A safety attachment for an automatic power operated car unloader, including the cable drawn shovel, the cable winding mechanism and the power control clutch thereof, said attachment comprising an extension from said control clutch, an actuating lever adjacent the free end of said extension, a flexible connection between said actuating lever and said extension, a barrier adapted to be positioned across the door opening of said car above the cable to said winding mechanism, a sheave supported above said actuating lever, a flexible element trained over said sheave and having one end connected to said actuating lever, a counter-weight carried on the other end of said flexible element, a trip-latch normally taking the strain of said counter-weight from said flexible element, and means connecting said barrier with said trip-latch for its actuation to release said counter-weight, whenever the barrier is forcibly contacted by a person entangled in the cable between said shovel and the barrier, the pull of the counter-weight on said flexible element acting to operate the actuating and control levers to disconnect said power from said winding mechanism.

2. The combination of the power control clutch of a cable drawn shovel type of car unloader and a safety attachment therefor, said attachment comprising a barrier adapted to be mounted across a door opening of a car above the shovel cable, an operating means connecting said clutch, latching means normally set to hold said operating means at the power applying position of the clutch, means extending from said barrier to said latching means, to effect the release of the latching means whenever the barrier is forcibly contacted by a person becoming entangled with the cable between the shovel and the barrier, and other means for actuating said operating means and the clutch to disconnect the power from said winding mechanism for stoppage of cable movement upon the release of said latching means.

3. The invention as defined in claim 2, with said barrier and the means extending therefrom to said latching means constituted in an elongated flexible element, and a means secured to each side of a door opening of a box-car or the like to support the barrier in place, the barrier forming portion of said flexible element being trained through one of said supporting means and having its free end secured to the other of said supporting means.

4. The invention as defined in claim 2, with said operating means constituted in a length of cable having one end operatively connected to the movable element of said clutch and its other end provided with a weight, and said latching means normally set to secure said weight and the attached cable at the power applying position of the clutch, said weight being released upon the release of said latching means and acting to exert a pull on the attached cable and the movable element of the clutch to effect disconnection of the power from said winding mechanism.

HARVEY P. WATSON.
GEORGE W. ROGERS.

REFERENCES CITED

The following references are of record in the file of this patent:

UNITED STATES PATENTS

| Number | Name | Date |
|---|---|---|
| 92,250 | Beathe | July 6, 1869 |
| 272,790 | Stark et al. | Feb. 20, 1883 |
| 317,083 | Bradford | May 5, 1885 |
| 398,502 | Dyblie et al. | Feb. 26, 1889 |
| 548,527 | Dixon | Oct. 22, 1895 |
| 798,687 | Machut | Sept. 5, 1905 |
| 1,038,800 | Tallon | Sept. 17, 1912 |
| 2,189,373 | Steel | Feb. 6, 1940 |